United States Patent
Fey et al.

(10) Patent No.: US 6,775,913 B2
(45) Date of Patent: Aug. 17, 2004

(54) BATTERY OPERATED CIRCULAR SAW

(75) Inventors: Michael Fey, Kaufering (DE); Günter Haas, Kaufering (DE); Rainer Ontl, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/225,883

(22) Filed: Aug. 19, 2002

(65) Prior Publication Data

US 2003/0037445 A1 Feb. 27, 2003

(30) Foreign Application Priority Data

Aug. 23, 2001 (DE) .......................................... 101 41 454

(51) Int. Cl.$^7$ ............................................. B23D 45/16
(52) U.S. Cl. ............................. 30/388; 30/263; 30/382; 30/DIG. 1; 16/423
(58) Field of Search .......................... 30/388, 263, 391, 30/382, DIG. 1; 16/423

(56) References Cited

U.S. PATENT DOCUMENTS

| | | | | |
|---|---|---|---|---|
| 4,219,932 A | * | 9/1980 | Nagashima et al. | 30/381 |
| 4,555,849 A | * | 12/1985 | Ando et al. | 30/388 |
| 4,847,513 A | * | 7/1989 | Katz et al. | 307/149 |
| 5,930,903 A | * | 8/1999 | Hurn et al. | 30/391 |
| 6,161,293 A | * | 12/2000 | Watson | 30/377 |
| 6,202,311 B1 | * | 3/2001 | Nickels, Jr. | 30/376 |
| 6,308,424 B1 | * | 10/2001 | Stielper | 30/391 |

* cited by examiner

Primary Examiner—Allan N. Shoap
Assistant Examiner—Phong Nguyen
(74) Attorney, Agent, or Firm—Sidley Austin Brown & Wood, LLP

(57) ABSTRACT

A battery (4) driven circular saw includes a housing (1a) with a motor (3) for driving the circular saw blade (2). The circular saw blade (2) is fixed to a drive shaft (7) that runs transverse to the plane (E) of the circular saw blade (2), the drive shaft being functionally connected by means of a linkage (15) to the motor (3). In order to achieve the most compact construction possible of the circular saw, the axis of rotation (R) of the motor (3) runs parallel to the plane (E) of the circular saw blade (2).

7 Claims, 3 Drawing Sheets

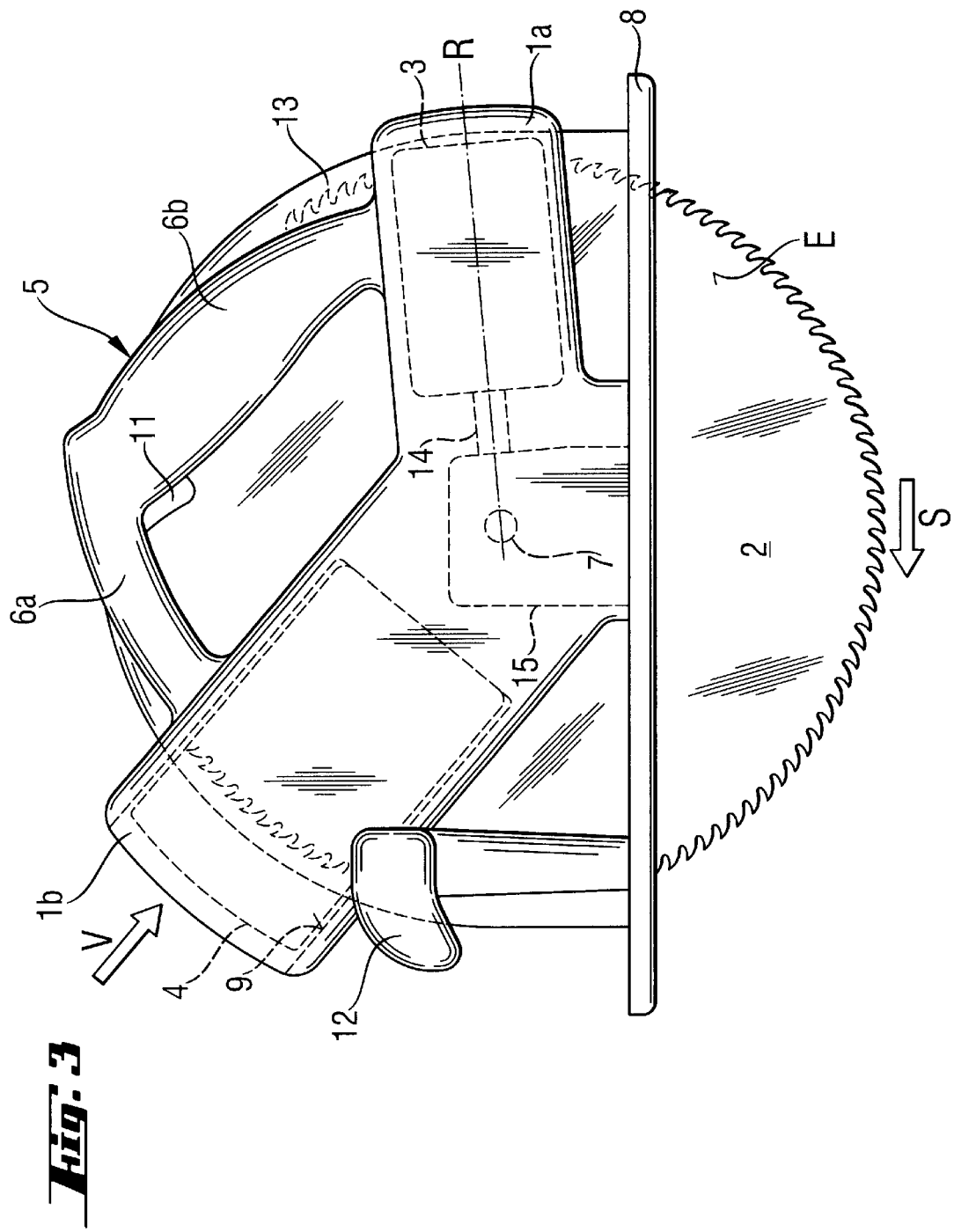

BATTERY OPERATED CIRCULAR SAW

BACKGROUND OF THE INVENTION

The invention relates to a hand-held circular saw with a housing for a motor which drives the saw blade and a housing for a rechargeable battery for powering the motor, wherein a U-shaped handle running parallel to the plane of the circular saw blade extends between the housings and is connected at the ends of its arms to the housings.

Hand held circular saws of the type described above have a circular saw blade that is driven by a motor mounted in a housing. A rechargeable battery installed in another housing supplies the motor driving power necessary, for example, electrical energy. By virtue of the use of a battery or a similar energy storage means, the user of the circular saw is independent of the availability of a power supply mains for operating the circular saw, in particular for operation of the motor.

DE 3318507 discloses such a circular saw with a housing for a motor for driving a circular saw blade and a housing for a rechargeable battery. A U-shaped hand grip running parallel to the plane of the circular saw blade projects from and is connected by its arms to the both housings. The axis of rotation of the motor runs transversely to the plane of the circular saw blade.

The advantage presented by this well-known embodiment is that by the arrangement of the hand grip the circular saw heavily weighted by the battery and the motor can be fairly manually guided.

The drawback of this arrangement is that the circular saw exhibits a considerable range of movement transverse to the plane of the saw blade by virtue of the arrangement of the motor, the battery and the hand grip Furthermore, the use of a high-output motor or/and battery is significantly limited by virtue of the limited structural depth transverse to the circular saw blade.

SUMMARY OF THE INVENTION

The object of the present invention is to provide a hand guided circular saw with a rechargeable battery that is easy to handle and also permits sufficient space for a motor and a battery, thereby offering high cutting performance.

The object is achieved according to the invention in that the axis of rotation of the motor runs substantially parallel to the plane of the circular saw blade.

By virtue of the fact that the axis of rotation runs parallel to the plane of the circular saw blade, more powerful motors with greater dimensions can be used, without having to accept an extension transverse to the plane of the circular saw blade which would result in a reduction of handling ease of the circular saw. Particularly in the use of a battery-driven motor, the operation lifetime and consequently the maximum possible service life and/or cutting performance is also increased. Further, especially in the case of battery-driven circular saws, higher efficiency results, since, for example, newer motor types and batteries with greater dimensions can be used without sacrificing handling ease.

Moreover, the configuration of the motor increases the operational safety of the circular saw because the axis of rotation of the motor is arranged parallel to the plane of the saw blade and by virtue of this fact, in the event of blockage of the circular saw blade, the housing is not averted or swung horizontally in the same plane as the circular saw blade.

The axis of rotation of the motor is advantageously arranged transverse to the direction of cutting by the circular saw in such a fashion that there is an optimum distribution of the weight of the circular saw. Since most electrical motors exhibit an essentially cylindrical external contour, the cross-section of the electrical motor is less than its own length. With this design, the axis of rotation of the motor and./or the center of gravity of a rechargeable battery is preferably substantially in the plane fixed by the machining direction of gravity and the hand grip. With respect to the handling ease of the circular saw, this means that it is possible for the user to hold the circular saw in a machining position without an application of great force.

The housing for the battery in the insertion direction is arranged preferably tilted less than 85° with respect to the axis of rotation of the motor so that the dimension of the circular saw in the direction of cutting is kept to a minimum. Particularly in the case of battery-driven circular saws, a minimum dimension is very important, because in such circular saws ease of handling plays a significant role. Moreover, this compact construction relative to the direction of cutting makes possible optimum visibility. If, however, minimal expanse is important in the plane of the circular saw blade and perpendicular to the direction of cutting, then the housing for the battery is preferably arranged tilted in the direction of cutting more than 85° relative to the axis of rotation.

BRIEF DESCRIPTION OF THE DRAWING

The invention is more completely described read together with an exemplary embodiment, wherein:

FIG. 3 is a side view of another circular saw embodying the invention.

DETAILED DESCRIPTION OF THE INVENTION

Figure 1:
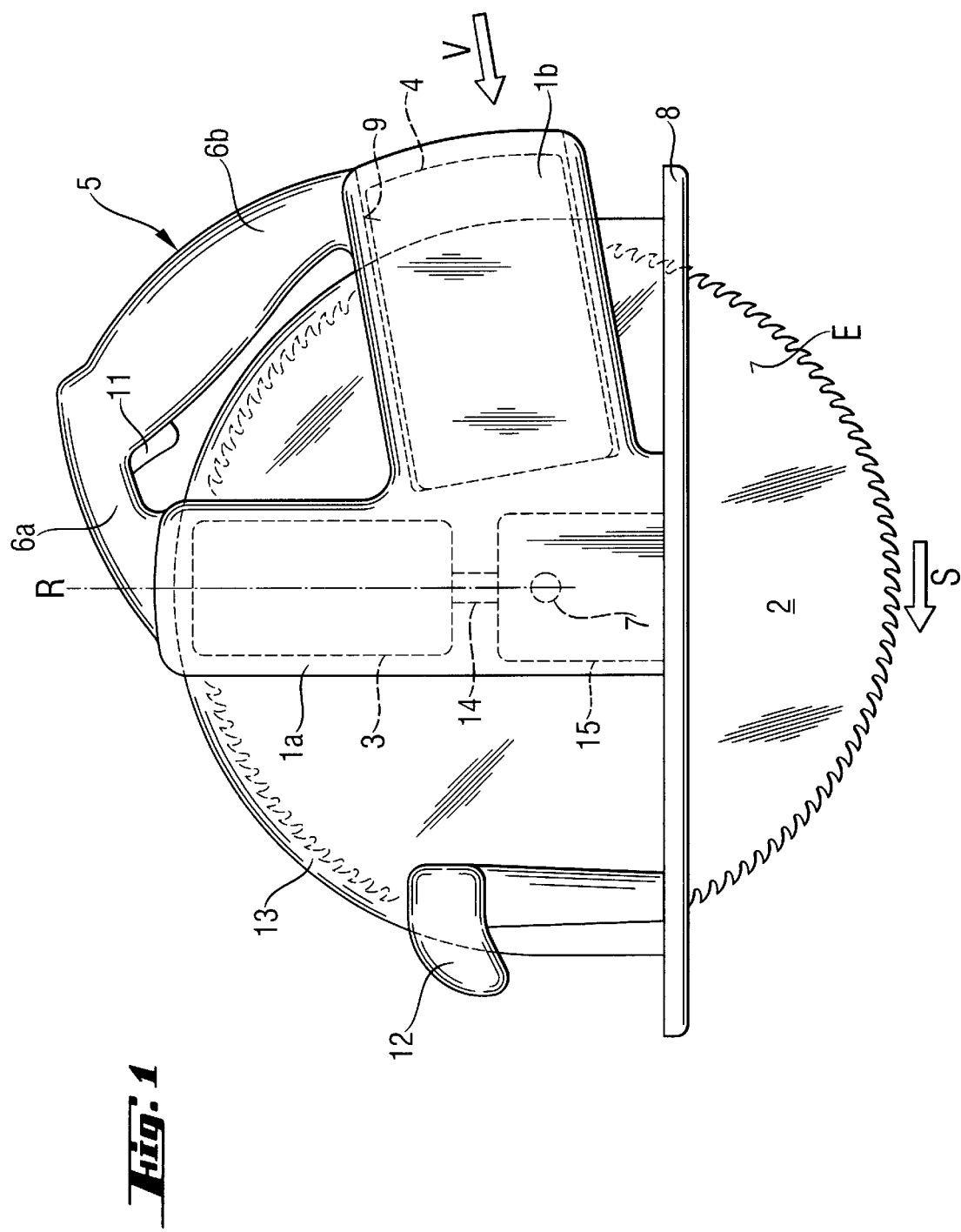
FIG. 1 is a side view of a circular saw according to the invention.

FIGS. 1 and 3 show a hand-guided circular saw with a housing 1a for a motor 3 for driving the circular saw blade 2 and a separate housing 1b for a rechargeable battery. A U-shaped hand grip 5 running parallel to the plane E of the circular saw blade 2 projects from the housings 1a, 1b and is connected to the housings 1a, 1b by its arms, 6a, 6b. Furthermore, the circular saw includes a support/contact plate 8 that is fixedly joined with both housings 1a, 1b and serves as the support on a surface of a work piece (not shown).

The circular saw blade 2 is fixed to a drive shaft/spindle, that extends transversely, of the plane E of the circular saw blade. The axis of rotation R of the motor 3, driven by the battery 4, runs perpendicular to the contact plate. The motor 3 has a motor spindle 14 that is functionally connected with the drive shaft 7 by means of a linkage 15 for transferring torque.

Relative to the contact plate, the slightly inclined housing 1b of the battery is essentially designed as a parallelepiped and serves to receive the battery 4. In order to design the battery to be easily exchangeable, the housing 1b has an opening in the housing side 9 facing away from the cutting direction S. The housing 1b for the battery 4 is positioned in the insertion direction V tilted by approximately 85° relative to the axis of rotation R. Further, the circular saw blade 2 is partially enclosed in a suction hood 13.

The hand grip 5 incorporates a switch 11 that serves to turn the motor 3 on and off In order to facilitate safe guidance of the circular saw according to the invention, a cross-sectionally mushroom-shaped supplemental grip 12 is arranged on the cutting direction S end of the contact plate 8.

Figure 2:
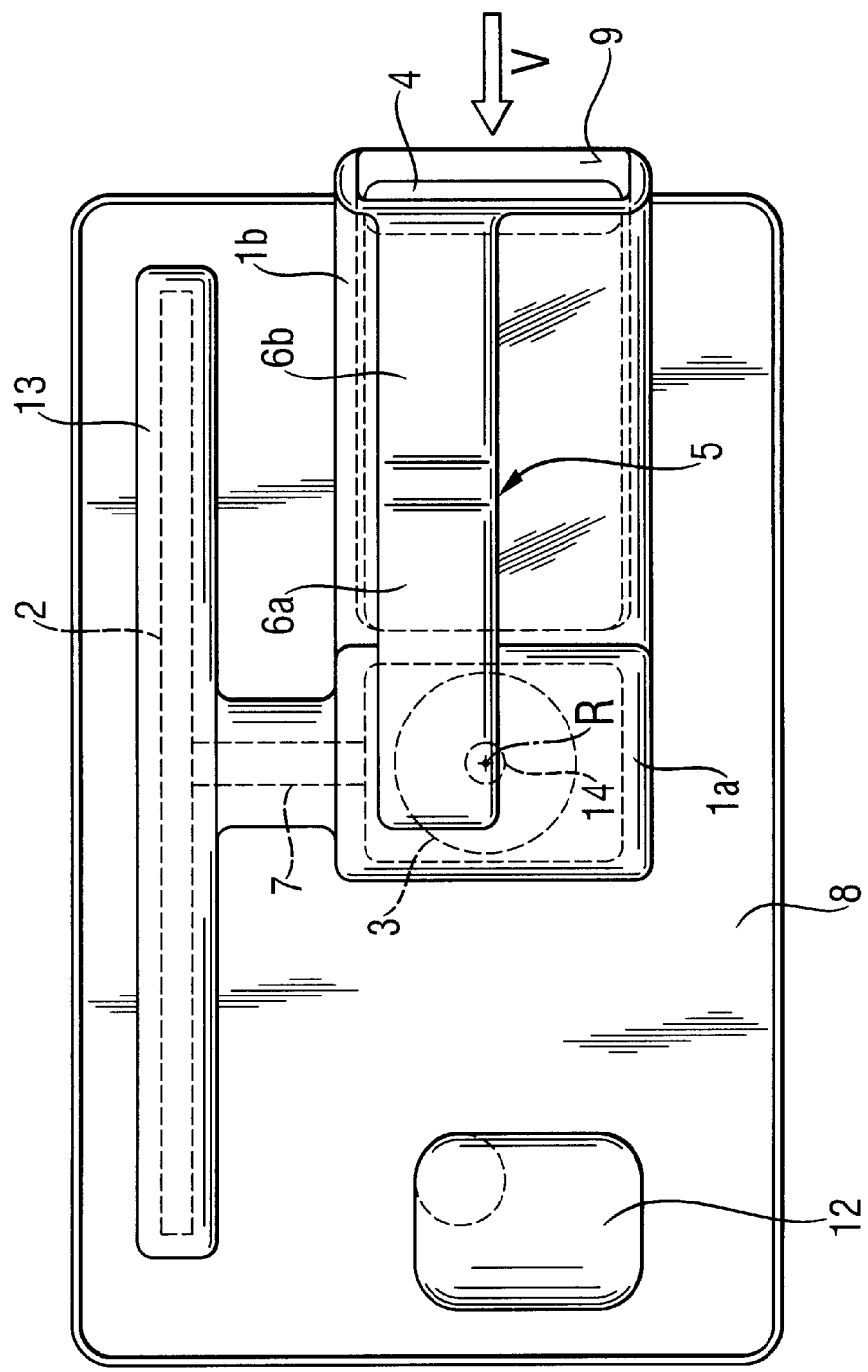
FIG. 2 is a top view of the circular saw shown in FIG. 1.

A circular saw according to the invention is depicted in FIG. 3 in which, differing from the embodiment represented in FIGS. 1 and 2, on the one hand the position of the battery 4 and the motor 3 is reversed and on the other hand the housing 1b of the battery 4 is arranged in the insertion direction spaced at an angle of approximately 130° with respect to the axis of rotation R.

What is claimed is:

1. A hand-held battery operated circular saw comprising a circular saw blade (2) having a planar surface (E), a first housing (1a) for a motor (3) driving said saw blade (2) and a second housing (1b) for a rechargeable battery (4) for powering said motor (3), a U-shaped hand grip (5) extending substantially parallel to said planar surface (E) of said saw blade and extending between said first and second housings (1a, 1b) and housing arms (6a, 6b) at opposite ends of said hand grip (5) with one said housing arm (6a) connected to said first housing (1a) and the other said housing arm (6b) connected to said second housing (1b), and said motor (3) having an axis of rotation (R) extending substantially parallel to said plane (E) of the saw blade (2).

2. A circular saw, as set forth in claim 1, wherein said axis of rotation (R) of said motor (3) is arranged transversely to a cutting direction (S) of said circular saw blade (2).

3. A circular saw, as set forth in claim 1, wherein said second housing (1b) for said battery (4) has an insertion direction (V) spaced angularly from said axis of rotation (R) of said motor (3) at an angle of less than 85°.

4. A circular saw as set forth in claim 1, wherein said second housing (1b) for said battery (4) has an insertion direction (V) spaced angularly from said axis of rotation (R) of said motor (3) at an angle of approximately 130°.

5. A circular saw, as set forth in claim 3, wherein said insertion direction (V) trails said axis of rotation (R) in a cutting direction (S) of said circular saw.

6. A circular saw, as set forth in claim 4, wherein said insertion direction (V) leads said axis of rotation (R) in a cutting direction (S) of said circular saw.

7. A circular saw, as set forth in claim 1, wherein a drive shaft (7) for said circular saw blade (2) extends transversely of the planar surface (E) of said saw blade (2) and is connected via a linkage (15) to a motor spindle (14) of said motor (3) extending along said axis of rotation (R).

* * * * *